(12) United States Patent
Tiirola et al.

(10) Patent No.: US 11,729,770 B2
(45) Date of Patent: Aug. 15, 2023

(54) CONFIGURING THE TRANSMISSION OF PERIODIC FEEDBACK INFORMATION ON A PHYSICAL UPLINK SHARED CHANNEL (PUSCH)

(75) Inventors: Esa Tapani Tiirola, Kempele (FI); Timo Erkki Lunttila, Espoo (FI); Kari Pekka Pajukoski, Oulu (FI); Kari Juhani Hooli, Oulu (FI); Matti Tapani Kiiski, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/256,652

(22) PCT Filed: Mar. 17, 2009

(86) PCT No.: PCT/EP2009/053134
§ 371 (c)(1),
(2), (4) Date: Sep. 15, 2011

(87) PCT Pub. No.: WO2010/105667
PCT Pub. Date: Sep. 23, 2010

(65) Prior Publication Data
US 2012/0002568 A1     Jan. 5, 2012

(51) Int. Cl.
| | |
|---|---|
| H04W 72/20 | (2023.01) |
| H04L 1/1607 | (2023.01) |
| H04L 1/00 | (2006.01) |
| H04L 5/00 | (2006.01) |
| H04W 72/1263 | (2023.01) |

(Continued)

(52) U.S. Cl.
CPC .......... *H04W 72/20* (2023.01); *H04B 7/0636* (2013.01); *H04L 1/0026* (2013.01); *H04L 1/0027* (2013.01); *H04L 1/1671* (2013.01); *H04L 5/0053* (2013.01); *H04W 28/26* (2013.01); *H04W 72/1263* (2013.01);

(Continued)

(58) Field of Classification Search
CPC ..... H04W 72/04–046; H04W 72/0406; H04W 28/20; H04W 28/26; H04W 72/085; H04W 72/1263; H04L 1/1671; H04L 1/0027; H04L 1/0026; H04L 5/0053; H04L 25/03898; H04L 5/001; H04L 5/0057; H04B 7/0636
USPC .................................................. 370/310–350
See application file for complete search history.

(56) References Cited

U.S. PATENT DOCUMENTS

| | | | |
|---|---|---|---|
| 9,716,571 B2 * | 7/2017 | Larsson | ................ H04L 1/1864 |
| 2005/0249164 A1 * | 11/2005 | Kwak et al. | .................. 370/335 |

(Continued)

FOREIGN PATENT DOCUMENTS

| | | |
|---|---|---|
| CN | 101252423 A | 8/2008 |
| JP | 2012501597 A | 1/2012 |

(Continued)

OTHER PUBLICATIONS

Erdem et al., "Transmission Methods for CQI in PUCCH", U.S. Appl. No. 61/106,847, filed Oct. 20, 2008, specification pp. 1-13 (Year: 2008).*

*Primary Examiner* — Joshua Kading
(74) *Attorney, Agent, or Firm* — Harrington & Smith (57) ABSTRACT

In order to facilitate sending of different kinds of channel feedback information, a periodic information transmission in a shared uplink channel is configured, PUSCH, and required resources are allocated for the transmission.

17 Claims, 5 Drawing Sheets

(51) Int. Cl.
*H04W 72/04* (2023.01)
*H04B 7/06* (2006.01)
*H04W 28/26* (2009.01)
*H04L 25/03* (2006.01)

(52) U.S. Cl.
CPC ............ *H04L 5/001* (2013.01); *H04L 5/0057* (2013.01); *H04L 25/03898* (2013.01); *H04W 72/04* (2013.01)

(56) References Cited

U.S. PATENT DOCUMENTS

| | | | |
|---|---|---|---|
| 2006/0120470 A1 | 6/2006 | Hwang et al. ................. 375/260 |
| 2007/0293233 A1* | 12/2007 | Inoue et al. ................... 455/450 |
| 2008/0311919 A1* | 12/2008 | Whinnett .......... H04W 72/0413 455/447 |
| 2009/0168731 A1* | 7/2009 | Zhang ................... H04L 1/1854 370/336 |
| 2009/0197610 A1* | 8/2009 | Chun ................ H04W 72/1284 455/450 |
| 2009/0247203 A1* | 10/2009 | Kuo ....................... H04W 76/28 455/509 |
| 2010/0034158 A1* | 2/2010 | Meylan ................. H04L 5/1469 370/329 |
| 2010/0080155 A1* | 4/2010 | Suzuki .............. H04W 72/0413 370/310 |
| 2010/0081443 A1* | 4/2010 | Meyer ................... H04L 1/1887 455/450 |
| 2010/0098012 A1* | 4/2010 | Bala ...................... H04L 1/1812 370/329 |
| 2010/0111010 A1* | 5/2010 | Wu ........................ H04W 76/28 370/329 |
| 2011/0083066 A1* | 4/2011 | Chung et al. ................. 714/807 |
| 2011/0107169 A1* | 5/2011 | Lohr .................. H04W 72/042 714/748 |
| 2011/0261776 A1* | 10/2011 | Ahn ........................ H04L 5/001 370/329 |
| 2013/0170437 A1* | 7/2013 | Onggosanusi ........ H04L 5/0037 370/328 |
| 2013/0279444 A1* | 10/2013 | Sagfors ................. H04L 1/0038 370/329 |
| 2014/0321391 A1* | 10/2014 | Zhang ................. H04W 74/002 370/329 |
| 2014/0376525 A1* | 12/2014 | Suzuki ............. H04W 56/0005 370/336 |
| 2015/0092721 A1* | 4/2015 | Papasakellariou et al. .. 370/329 |
| 2016/0234000 A1* | 8/2016 | Lee ............................ H04L 5/22 |
| 2016/0373233 A1* | 12/2016 | Pelletier ............. H04W 52/365 |
| 2018/0368122 A1* | 12/2018 | Kuchibhotla ....... H04W 72/085 |
| 2019/0372736 A1* | 12/2019 | Chang ........................ H04L 1/00 |

FOREIGN PATENT DOCUMENTS

| | | |
|---|---|---|
| WO | WO-2008/153081 A1 | 12/2008 |
| WO | WO 2009/088739 A1 | 7/2009 |
| WO | WO 2009/123549 | 10/2009 |

* cited by examiner

CONFIGURING THE TRANSMISSION OF PERIODIC FEEDBACK INFORMATION ON A PHYSICAL UPLINK SHARED CHANNEL (PUSCH)

FIELD

The invention relates to the field of telecommunications and, particularly, to transmitting periodic information.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolution of communications technologies and different services increase user needs to obtain over a wireless connection same broadband services that are obtained via a fixed connection. To fulfill both mobility requirements and increasing speed requirements, currently a solution called long term evolution release 8, below called LTE, has been specified in 3GPP (Third Generation Partnership Project). LTE is a packet-only wideband radio access with flat architecture that provides higher data speeds and reduced packet latency.

LTE air interface between user equipment (UE) and a base station, also called evolved node B (eNB), is based on an orthogonal frequency-division multiple access (OFDMA) in a downlink and a single-carrier frequency-division multiple access (SC-FDMA) in an uplink that efficiently supports multi-antenna technologies (MIMO). Further, in LTE a carrier bandwidth of up to 20 MHz is split into resource blocks (or physical resource blocks) with which a transmission between user equipment and a base station is scheduled on a shared channel. The shared channel may be formed by allocating resource blocks in different places of the frequency domain. The user equipment measures, using cell-specific or antenna-specific reference signals, downlink channel quality in a predetermined way and transmits downlink channel state information feedback, called CSI, on the uplink to the base station. When the base station performs the downlink scheduling, the base station preferably takes also into account received CSIs.

In LTE, CSI is sent either on a control channel called PUCCH (physical uplink control channel) in a periodic report having maximum size of 11 bits for feedback or on a user traffic shared channel called PUSCH (physical uplink shared channel) in an aperiodic report in which the feedback may be bigger but which can be sent only if the base station triggers the sending by specifically requesting the report by sending an uplink grant to the user equipment. The periodic report may be sent multiplexed on user data on the user traffic shared channel, when user equipment is scheduled, but the maximum size remains the same.

However, the capabilities of LTE will also evolve towards next generations systems, such as 4G systems, and it is evident that when the features of the air interface increases, the content of CSI will increase and thereby the amount and size of CSI needed and transmitted from the user equipment to the base station will increase, and the periodic and aperiodic reporting of LTE cannot be used as such.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An aspect of some embodiments is to provide a periodic information transmission in a shared uplink channel.

Various aspects of the invention comprise methods, apparatuses, a system and a computer program product, as defined in the independent claims. Further embodiments of the invention are disclosed in the dependent claims.

BRIEF DESCRIPTION OF THE DRAWINGS

In the following different embodiments will be described in greater detail with reference to the attached drawings, in which.

DETAILED DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any user terminal (i.e. user equipment), base station, corresponding component, corresponding apparatus, and/or to any communication system or any combination of different communication systems having a shared (i.e. a non-dedicated) channel wherefrom resources may be allocated dynamically or semi-persistently. The communication system may be a wireless communication system or a communication system utilizing both fixed networks and wireless networks. The protocols used and the specifications of communication systems, and apparatuses, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of an access architecture to which the embodiments may be applied, a radio access architecture based on LTE Advanced, LTE-A, that is based on OFDMA in a downlink and a single-carrier frequency-division multiple access SC-FDMA in an uplink, without restricting the embodiments to such an architecture, however.

Figure 1:
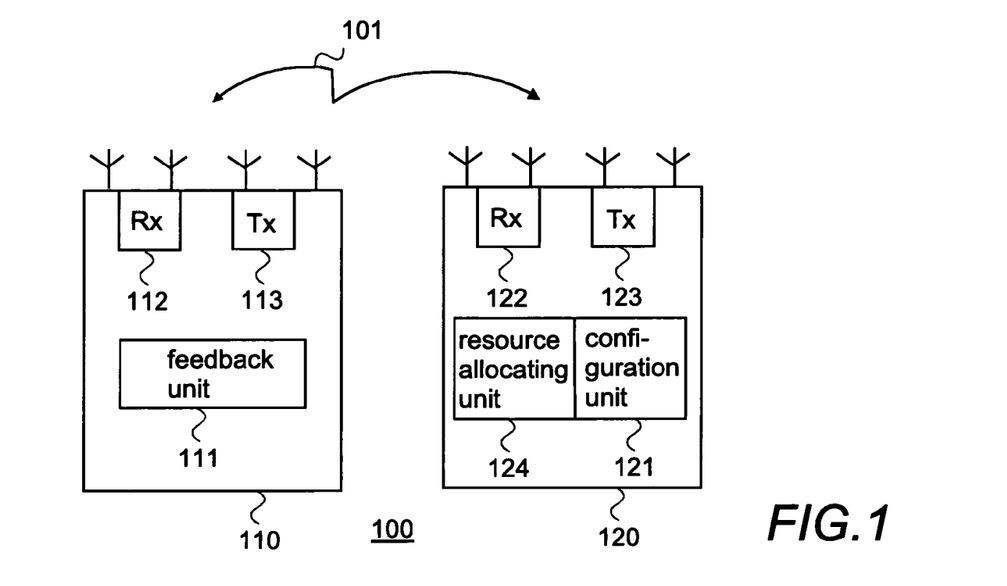
FIG. 1 shows simplified architecture of a radio access network and schematic diagrams of an apparatuses according to an embodiment.

A general architecture of LTE-A, or more precisely a radio access network 100 implementing LTE-A, is illustrated in FIG. 1. FIG. 1 is a simplified architecture only showing user equipment 110 configured to be in a wireless connection on communication channels 101 (only one shown in FIG. 1) in a cell with a base station 120 providing the cell, both apparatuses having some elements and functional entities, all being logical units whose implementation may differ from what is shown. It is apparent to a person skilled in the art that the radio access of LTE-A comprises in practice many base stations serving many user equipment, and one user equipment may use multiple cells, and the radio access of LTE-A may comprise other apparatuses, such as physical layer relay nodes.

The user equipment 110 illustrates one type of an apparatus to which resources on the air interface are allocated and assigned, and thus any feature described herein with user equipment may be implemented with a corresponding apparatus, such as a relay node. An example of such a relay node is a layer 3 relay (self-backhauling relay) towards the base station. The user equipment 110 refers to a portable computing device that includes wireless mobile communication devices operating with or without a subscriber identification module (SIM), including, but not limited to, the following types of devices: mobile phone, smartphone, personal digital assistant (PDA), handset, laptop computer. The user equipment 110 (or a layer 3 relay node) is configured to perform one or more of user equipment functionalities described below with an embodiment, and it may be configured to perform functionalities from different embodiments. For this purpose, the user equipment (or the layer 3 relay node) comprises a feedback unit 111 for providing functionality to form and transmit feedback information according to one or more of the embodiments described below. Further, the apparatus comprises a receiving unit 112 for receiving different inputs, control information, user data and messages, for example, and a sending unit 113 for sending different outputs, control information, user data and messages, for example.

The base station, or advanced evolved node B, 120 is a computing device configured to control the radio resources, and connected to a communication system (not shown in FIG. 1) thereby providing the user equipment 110 a connection to the communication system. In other words, in the illustrated embodiment, all radio-related functionalities of the communication system are located in the base station which, for example, configures connection parameters and controls the user equipment measurement reporting. The base station 120 is configured to perform one or more of base station functionalities described below with an embodiment, and it may be configured to perform functionalities from different embodiments. For this purpose, the base station comprises a configuration unit 121 for providing functionality to configure transmission of feedback information according to one or more of the embodiments described below, and a resource allocator unit 124 for allocating resources for the feedback information according to one or more of the embodiments described below. The resource allocator unit 124 may be integrated with the configuration unit, or with a physical uplink shared channel scheduler (not shown in FIG. 1). Further, the apparatus comprises a receiving unit 122 for receiving different inputs, control information, user data and messages, for example, and a sending unit 123 for sending different outputs, control information, user data and messages, for example.

In embodiments, in which a common (more centralized) radio resource management and/or scheduling is applied, the configuration unit may locate in another network entity/node than the resource allocator unit, the other network entity taking care of configurations of several cells or base stations or relays. Depending on the implementation, the network entity may further comprise, at least for some cells (or base stations or relays), the resource allocator or some functionality of the resource allocator unit. However, in the following it is assumed that the functionalities locate in the same base station without restricting the embodiment to such a solution.

Although the apparatuses, i.e. the user equipment and the base station, have been depicted as one entity, different units, and processors and memory (not shown in FIG. 1) may be implemented in one or more physical or logical entities. The units may be software and/or software-hardware and/or firmware components (recorded indelibly on a medium such as read-only-memory or embodied in hard-wired computer circuitry).

The apparatuses may generally include a processor (not shown in FIG. 1), controller, control unit, micro-controller, or the like connected to a memory and to various interfaces of the apparatus. Generally the processor is a central processing unit, but the processor may be an additional operation processor. The feedback unit 111, the configuration unit 121 and/or the resource allocation unit 124 may be configured as a computer or a processor, or a microprocessor, such as a single-chip computer element, or as a chipset, including at least a memory for providing storage area used for arithmetic operation and an operation processor for executing the arithmetic operation. The feedback unit 111, the configuration unit 121 and/or the resource allocation unit 124 may comprise one or more computer processors, application-specific integrated circuits (ASIC), digital signal processors (DSP), digital signal processing devices (DSPD), programmable logic devices (PLO), field-programmable gate arrays (FPGA), and/or other hardware components that have been programmed in such a way to carry out one or more functions of one or more embodiments.

The receiving units and the transmitting units each provides an interface in an apparatus, the interface including a transmitter and/or a receiver or a corresponding means for receiving and/or transmitting information, such as data, content, control information, messages and performing necessary functions so that user data, content, control information, messages can be received and/or transmitted. The receiving and sending units may comprise a set of antennas, the number of which is not limited to any particular number.

The apparatuses may generally include volatile and/or non-volatile memory (not shown in FIG. 1) and typically store content, data, or the like. For example, the memory may store computer program code such as software applications (for example for the emergency location continuity unit) or operating systems, information, data, content, or the like for the processor to perform steps associated with operation of the apparatus in accordance with embodiments. The memory may be, for example, random access memory, a hard drive, or other fixed data memory or storage device. Further, the memory, or part of it, may be removable memory detachably connected to the apparatus.

It should be appreciated that the apparatus may comprise other units used in or for information transmission. However, they are irrelevant to the actual invention and, therefore, they need not to be discussed in more detail here.

In an embodiment, the user equipment is configured to utilize a single user multiple input multiple output (SU-MIMO) transmission on the communication channel 101 with the base station 120. In SU-MIMO, the antenna arrangement comprises a set of antennas or an antenna array configured to form more than one transmission streams. The transmission streams may be obtained using several antennas, antenna beams or suitably coding.

In another embodiment, a multi-user multiple input multiple output (MU-MIMO) is utilized in the radio access network 100. In MU-MIMO, multiple users in a cell are utilizing the same transmission resources.

In another embodiment, a coordinated multi-point (CoMP) is utilized in the radio access network 100. CoMP, applied in an uplink transmission direction, implies the reception of the transmission of user equipment at multiple, geographically separated points. In CoMP, the management and scheduling of radio resources may be taken care of by a common radio resource scheduler that may locate in a "management node" separate from base stations, or the common radio resource scheduler may locate in one base stations but the network may contain also base stations not having a radio resource scheduler.

Below different embodiments are disclosed using feedback information as an example of a control information, and data as an example of all other information. Further, in FIGS. 2, 3 and 4, the use of shared channel (PUSCH) is illustrated with dashed line, and the use of a control channel (a physical downlink control channel (PDCCH) and/or a physical uplink control channel (PUCCH), if used) is illustrated with continuous (non-dashed) line.

Figure 2:
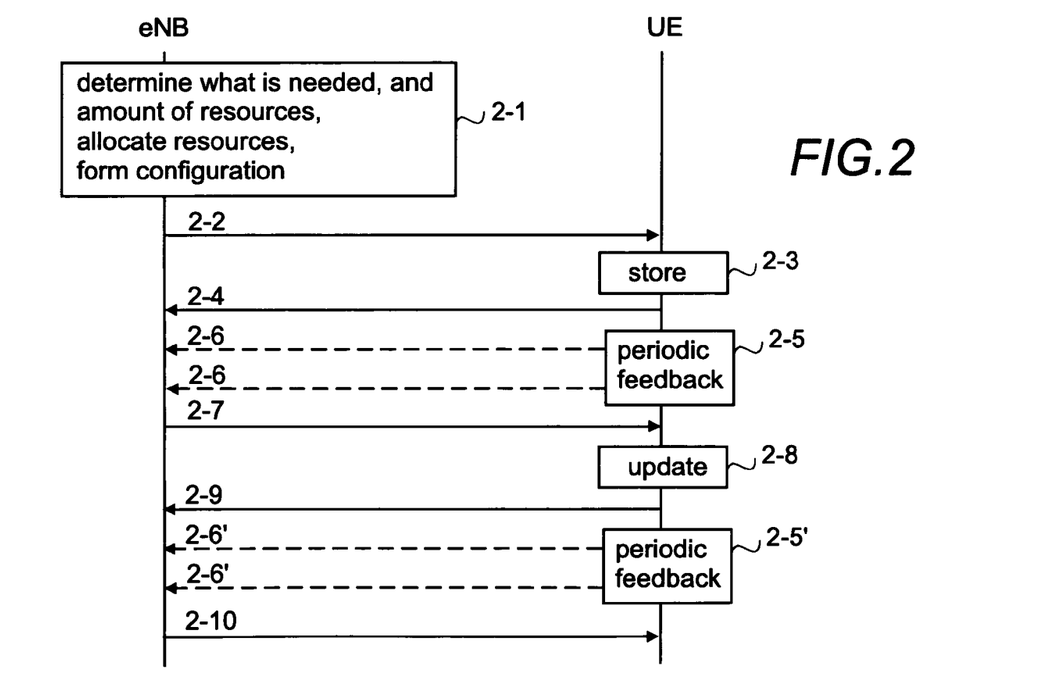
FIGS. 2, 3 and 4 are information exchange diagrams illustrating exemplary information exchanges according to embodiments.

FIG. 2 illustrates information exchange according to an embodiment. In the embodiment it is assumed for the sake of clarity that the user equipment, UE, supports periodic feedback on PUSCH, and accepts configurations the user equipment receives from the base station, and that periodic feedback configuration and resource allocation is performed semi-persistently via a higher layer signalling, the illustrated example of which is a radio resource control (RRC) signalling. It should be appreciated that any other higher layer signalling may be used.

FIG. 2 starts in a situation in which the base station detects a need for feedback information from the user equipment that supports periodic feedback on PUSCH. For example, the base station notices that there will be user data to be sent on downlink to the user equipment. Therefore the base station determines, in point 2-1, what feedback information is needed, then determines, in point 2-1, the amount of resources needed for conveying the needed feedback information, allocates, in point 2-1, resource blocks from the shared uplink user traffic channel PUSCH, and forms, in point 2-1, a configuration for a periodic feedback on PUSCH, and sends the configuration in message 2-2. A resource block refers herein to a minimum unit that can be allocated. The message 2-2 may be an "RRC connection set up" that contains different radio recourse configurations, including the configuration for a periodic feedback on PUSCH. The configuration for a periodic feedback on PUSCH is a semi-persistent configuration and may contain parameters/fields described in Table 1. It should be appreciated that although the table 1 has a number for each parameter, the numbers are not part of the configuration, they are added to facilitate and clarify the description. Further, it should be appreciated that table 1 is only an example, and other parameters/fields may be sent in a configuration and some of the parameters described in table 1 may be left out.

TABLE 1

| No | Parameter | Description |
|---|---|---|
| 1 | Periodicity | the periodicity of the reporting, for example in terms of sub-frames |
| 2 | Offset | reference, for example, as described below: reporting instances for period feedback are sub-frames satisfying $(10 \times n_f + \lfloor n_s/2 \rfloor - N_{OFFSET}) \bmod N_P = 0$, where $n_f$ is a system frame number, $n_s = \{0, 1, \ldots, 19\}$ is a slot index within the frame, and $N_{OFFSET}$ is the corresponding periodic feedback reporting offset (in sub-frames) and $N_P$ is the periodic feedback period (in sub-frames) |
| 3 | Reporting mode | for example, specific format, aggregated band, feedback type, such as best-M (one channel quality indicator/preceding matrix index value for best M sub-bands) |
| 4 | Per cell/component carrier reporting, and support for advanced MU-MIMO pairing | for example, indication of the cells (coordinated multi-point transmission), indication of component carriers, subject to reporting |
| 5 | Resource block assignment | indication of what physical resources to use for transmission, such as localized and clustered transmission |
| 6 | Sub-resource assignment | orthogonal cover code, additional cover code, special handling in case with sounding reference signal (SRS) |
| 7 | Duration | duration of the resource allocations, for example, in terms of seconds, one shot, infinite |
| 8 | Hopping information | indicates whether or not PUSCH hopping (Type 1 or Type 2) is used |
| 9 | Modulation and coding scheme | modulation and coding scheme (MSC) table index |
| 10 | Cyclic shift for demodulation reference signal (DM RS) | value of a cyclic shift to be used |

TABLE 1-continued

| No | Parameter | Description |
|---|---|---|
| 11 | UL transmission mode | for example, single antenna port, transmitter diversity, open loop spatial multiplexing |
| 12 | ACK/NAK (AN) | time division multiplexing (TDM) between AN/data or multi-carrier (PUCCH + periodic feedback information on PUSCH) |
| 13 | Transmission time interval (TTI) bundling information | indication of whether or not TTI bundling (repetition) is used |
| 14 | Report splitting | indication whether or not a report is split into multiple sub-frames |

New parameters for a PUSCH configuration, when compared to LTE release 8, are parameters 1, 2, 4, 6, and 10-14. Parameters 1 and 2 are based on corresponding parameters relating to PUCCH configuration in LTE release 8, and they may be combined into one field. Further, parameters 3, 5, and 7-9, although corresponding to PUSCH parameters in LTE release 8, may be amended. For example, in the above parameter 8 does not indicate a signal redundancy version since HARQ (hybrid automatic response request) is not used with feedback information in the described embodiment. Further, a resource block assignment (parameter 5), modification and coding scheme (parameter 8), and cyclic shift allocation (parameter 9) may use the principles defined for LTE release 8, but they may take into account new features introduced in LTE-advanced, such as a clustered resource assignment principle.

The parameters 1 to 4 indicate that the configuration relates to periodic reporting and describe what information is needed in reports and what the periodicity is. For example, a periodicity with value 1 may indicate that the resource is allocated in each sub-frame (i.e. as a continuous one), a periodicity with value 2 may indicate that the resource is allocated from every second sub-frame, etc. However, it should be appreciated that any other periodicity definition may be used. The content of a feedback information report is configured by the parameters 3 and 4. The feedback information may contain, for example, a channel quality indicator CQI, preceding matrix indicator PMI, rank indicator RI, quantized complex channel impulse or frequency response, and/or component carrier aggregation-specific information. CQI corresponds preferably to a transport block size/modulation and coding scheme (TBS/MCS) the user equipment is able to support on the assigned sub-band. It should be appreciated that the content of the feedback information is not limited in any way; it may be anything determined useful. Further, the feedback information may be absolute values or delta values, i.e. represented as relative to some information.

The parameters 5 to 12 assign the allocated resources for the feedback information transmission. Sub-resource assignment, i.e. sub-channelization within the allocated physical resource is supported in LTE-A, and therefore the configuration contains the new parameter 6. The parameter 6 defines sub-channelization on the allocated resource, thereby making an allocation granularity (i.e. one resource block offers more resources than feedback information typically contains) less coarse. For example, the parameter 6 may indicate a code division multiplexing/frequency division multiplexing (CDM/FDM) sub-channel to be used. The new parameter 7 defines how long the resources are allocated. There is no restriction on how long the resources may be allocated; they may be allocated infinite, for one shot, for certain time period, for certain amount of transmissions, etc. In order to provide a possibility to increase frequency diversity, the new parameter 8 defines whether or not (and if yes, how) PUSCH hopping is utilized. Since LTE-A supports multi-antenna transmissions also on uplink, uplink transmission mode needs to be configured by the new parameter 11. The parameter 12 may be used to indicate whether or not acknowledgments and negative acknowledgement are sent in the periodic information the configuration relates to. It should be appreciated that the presence or absence of the parameter 12 may indicate the same.

The parameters 13 and 14 relate to enhancing the coverage of the feedback information. With the parameter 13 it may be defined whether or not to apply sub-frame (or sub-slot) repetition for the entire PUSCH, including cyclic redundancy check information (CRC). Further, orthogonal cover codes may be applied over repeated sub-frames. Parameter 14 enables transmission of multiple sub-reports of a single feedback information report in consecutive sub-frames. A sub-report may be self-decodable or non-self-decodable, and each sub-report may contain feedback information on one component carrier or one cell, when the coordinated multi-point is applied. (A component carrier or a cell defines what is measured/reported, i.e. in practice how many bits one report contains.)

In response to the above configuration in message 2-2, the user equipment stores the configuration in point 2-3, acknowledges the configuration in message 2-4, and starts to apply the periodic feedback on PUSCH in point 2-5. More precisely, the user equipment initializes its periodicity counter in the feedback unit to correspond to the received configuration, collects the feedback information requested, and sends periodically feedback information 2-6 on PUSCH without any specific request.

After a while the base station wants to modify the configuration. It may, for example, modify the content of the reports or reallocate resources, and therefore the base station, after modifying the content of the configuration, sends, in message 2-7, such as "RRC connection reconfiguration" or "RRC connection configuration", the modified configuration, i.e. in the illustrated example the parameters disclosed in table 1 but at least one of them having a different value compared to a value sent in message 2-2.

The user equipment updates, in point 2-8, the configuration, acknowledges the reconfiguration by sending message 2-9 (which may be "RRC connection reconfiguration completed") and continues collecting and sending the feedback information 2-6' according to the modified configuration in point 2-5'.

When the base station determines that it does not any more need the periodic feedback information, the base station sends message 2-10, such as "RRC connection release" and releases allocated resources (not shown in Figure). After that the user equipment deletes the configuration from its memory and stops sending the feedback information on PUSCH. Thus, in the illustrated example the duration (parameter 7) has a value "infinite". However, also some other event than the duration value configured in message 2-2 expiring, or the release command, may cause that the user equipment stops sending the periodic feedback information on PUSCH. An example of such an event is that the user equipment enters a power saving state (DXR, discontinuous reception).

Thus, sufficiently accurate feedback information is sent over PUSCH without "UL grant" as long as the feedback information is needed. This reduces the downlink overhead.

Figure 3:
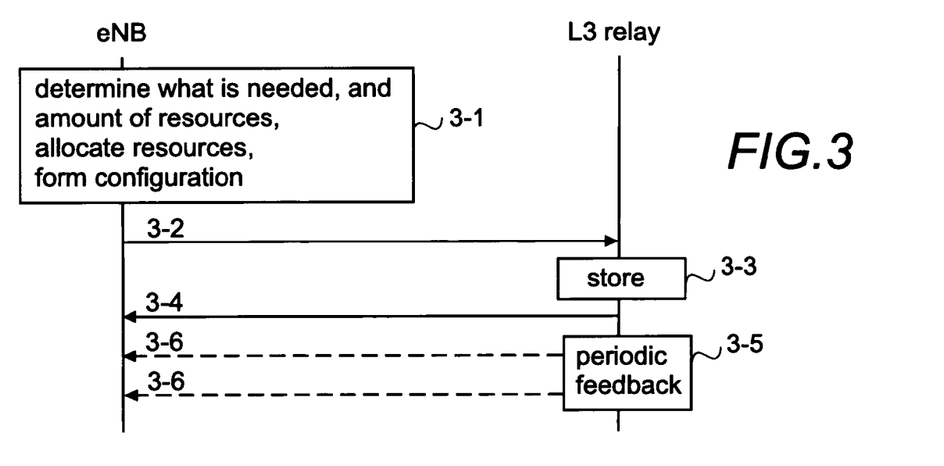

FIG. 3 illustrates information exchange according to another embodiment. In the embodiment it is assumed that a base station, eNB, requests that a layer 3 relay node transmits periodic data on PUSCH. In the example illustrated in FIG. 3, it is further assumed for the sake of clarity that the layer 3 relay node supports periodic information on PUSCH, and accepts configurations the layer 3 relay node receives from the base station. Further, in the embodiment it is assumed that configuration for periodic information is performed semi-persistently via a higher layer signalling, the illustrated example of which is a radio resource control (RRC) signalling. It should be appreciated that any other higher layer signalling may be used. In the embodiment, the physical resources are allocated dynamically by a PUSCH scheduler, and the allocation information is sent over physical downlink control channel.

FIG. 3 starts in an exemplary situation in which the base station, eNB, determines that it needs to schedule the layer 3 relay node, L3 relay, supporting periodic information on PUSCH in order to obtain uplink data via the layer 3 relay node. Therefore the base station determines, in point 3-1, the amount of resources needed for conveying the data, allocates, in point 3-1, resource blocks from the shared uplink user traffic channel PUSCH, and forms, in point 3-1, a configuration for a periodic information on PUSCH, and sends the configuration in message 3-2. The message 3-2 may be a message as described above, including the configuration for periodic information on PUSCH. The configuration for a periodic feedback on PUSCH is a semi-persistent configuration and may contain parameters/fields described in Table 1 above. However, in the embodiment illustrated in FIG. 3, the configuration does not contain parameters defining feedback information to be reported, i.e. parameters 3 and 4 are omitted, since the periodic reports are used for data transfer. Further, ACK/NAK-parameter 12 may be omitted in the example. In another embodiment of the invention, the parameters 3 and 4 are used to define the data to be sent in reports.

In response to the above configuration in message 3-2, the layer 3 relay node stores the configuration in point 3-3, acknowledges the configuration in message 3-4, and starts to apply the periodic information on PUSCH in point 3-5 according to a channelling configured by the configuration in message 3-2 when sending (point 3-5) periodic data 3-6 as long as the duration in the configuration message indicates, or a new resource reservation is received, or a new configuration message is received, or the connection is not disabled. However, these are not illustrated in FIG. 3. More precisely, the layer 3 relay node initializes its periodicity counter in the feedback unit to correspond the received configuration, and sends periodically data 3-6 on PUSCH without any specific request.

It should be appreciated that user equipment may as well be configured to send data as described above with FIG. 3 and the layer 3 relay node. In that case periodic feedback information may be configured with a separate message, for example, as described above with FIG. 2.

Figure 4:
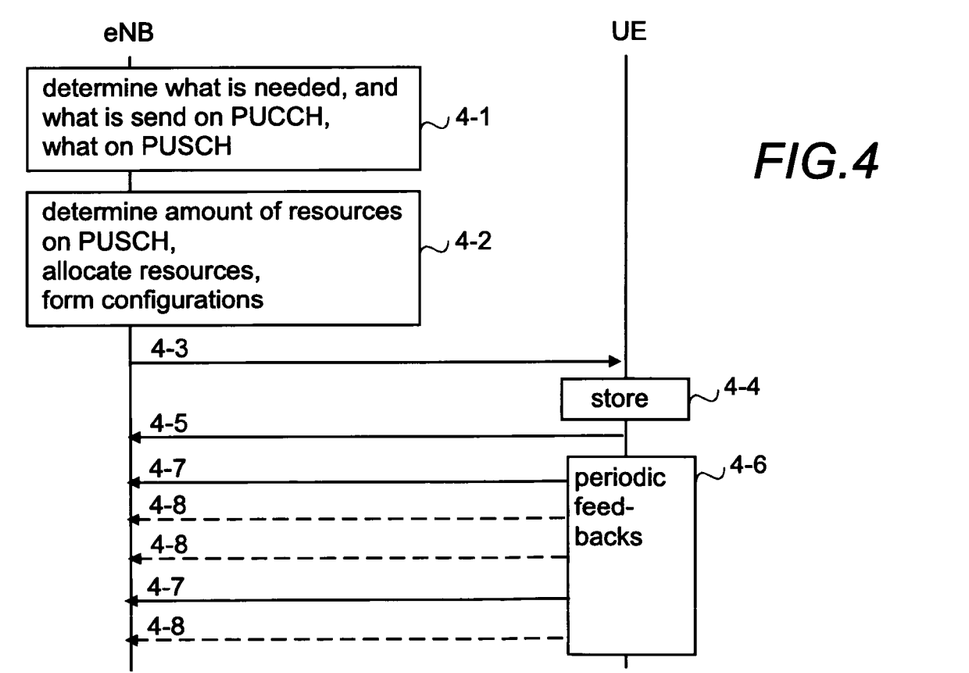

FIG. 4 illustrates information exchange according to a further embodiment. In the embodiment it is assumed that a base station, eNB, requests that periodic feedback is transmitted concurrently on PUCCH and PUSCH. In the example illustrated in FIG. 4, it is further assumed for the sake of clarity that the user equipment, UE, supports periodic feedback on PUSCH, and accepts configurations the user equipment receives from the base station. Further, in the embodiment it is assumed that periodic feedback configuration and resource allocation is performed semi-persistently via a higher layer signalling, the illustrated example of which is a radio resource control (RRC) signalling. It should be appreciated that any other higher layer signalling may be used and/or resource allocation may be performed dynamically.

FIG. 4 starts in the same situation as FIG. 2, i.e. the base station detects a need for feedback information from the user equipment supporting periodic feedback on PUSCH. Therefore the base station determines, in point 4-1, what feedback information is needed, then determines, in point 4-1, what information is to be sent on PUCCH and what on PUSCH. Then the base station determines, in point 4-2, the amount of resources (symbol and power, for example,) needed for conveying the feedback information to be sent on PUSCH and resources (if any) needed on PUCCH, and forms, in point 4-2, a configuration for a periodic information on PUSCH, and a configuration for a periodic ACK/NAK on PUCCH, and sends the configurations in message 4-3. The configuration for a periodic feedback on PUSCH may contain parameters/fields described in Table 1 above. However, in the embodiment illustrated in FIG. 4, the configuration for a periodic feedback on PUSCH indicates that no ACK/NAK is sent on the periodic feedback on PUSCH.

In response to the above configurations in message 4-3, the user equipment stores the configurations in point 4-4, and acknowledges the configurations in message 4-5. The user equipment also performs, in point 4-6, the periodic feedback by collecting feedback information according to the configurations and sending periodic ACK/NAK 4-7 on PUCCH and other periodic feedback information 4-8 on PUSCH according to the corresponding configurations as long as the corresponding connection is not disabled, or reconfigured (not shown in FIG. 4).

In another embodiment, based on the one described with FIG. 4, the user equipment multiplexes ACK/NAK information with the other feedback information, i.e. like channel state information is multiplexed with user data in LTE release 8.

In another embodiment, the base station is further configured to select, on the basis of the needed feedback information, the most efficient way to obtain feedback information. In other words, the base station determines whether to use periodic feedback on a control channel (multiplexed with uplink user data if the user equipment is scheduled), or aperiodic feedback information on a shared channel, or periodic feedback information on pre-assigned resources on the shared channel.

In another embodiment of the invention, the base station configures periodic feedback on control channel (PUCCH), aperiodic feedback and periodic feedback on the shared channel (PUSCH), and indicates in the configuration which one of the periodic reporting to use with a specific feedback information. Another implementation of the embodiment is that the user equipment selects which periodic reporting to use, aperiodic is used only on specific request. In the embodiment, the user equipment may perform the selections report by report.

Figure 5:
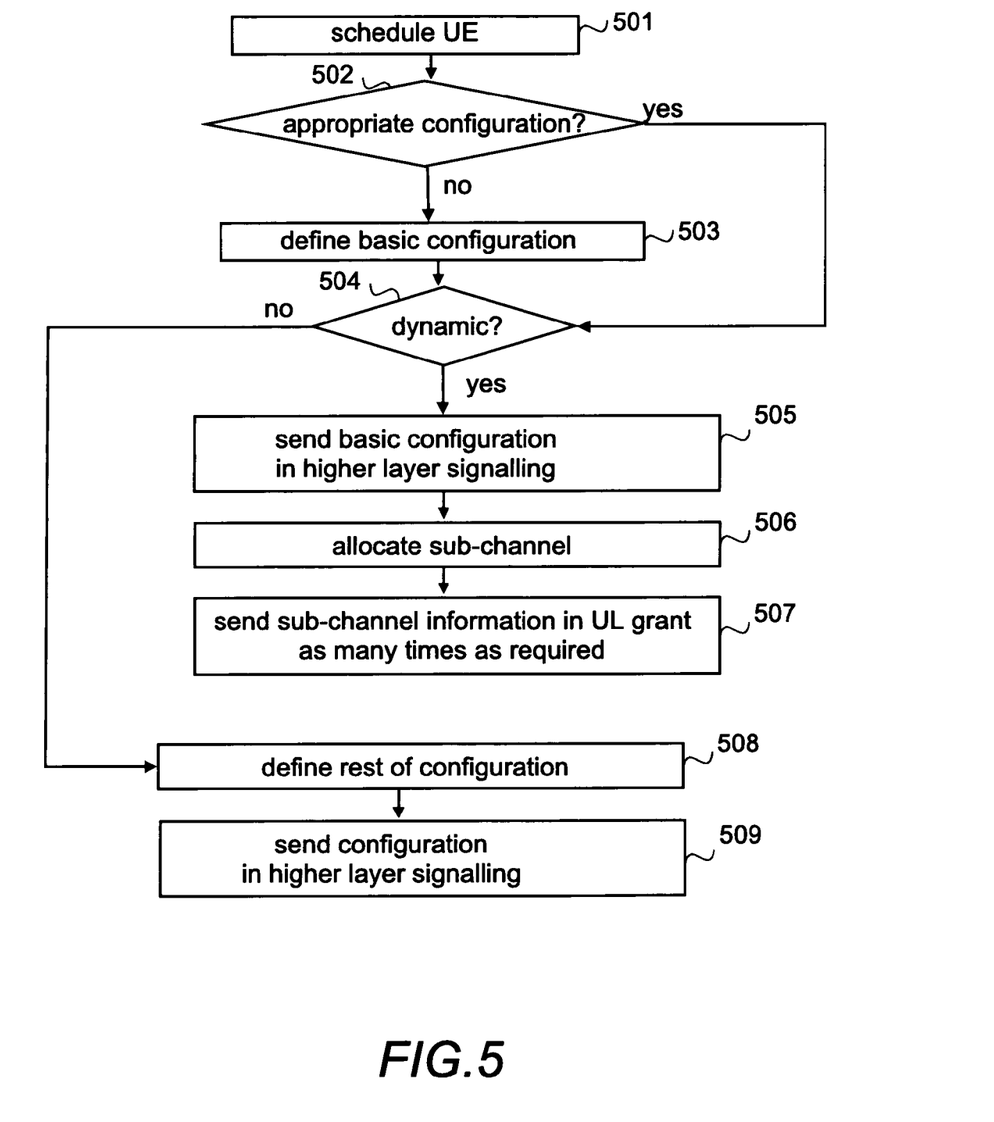
FIG. 5 is a flow chart illustrating resource allocations according to an embodiment.

FIG. 5 is a flow chart illustrating scheduling according to an embodiment, in which a base station, or more precisely the resource allocating unit, is configured to allocate resources reserved for periodic information on PUSCH to dynamically scheduled user equipment and to semi-persistent user equipment.

The base station is going to schedule, in step 501, user equipment so that the user equipment uses resources received for periodic information on PUSCH. However, no appropriate configuration exist (step 502), and the base station defines, in step 503, a basic configuration of periodic information on PUSCH. The basic configuration defines at least a period to be used, allocated resources from the PUSCH (using a resource block granularity), a sub-channelization (the used cover code, for example) and the lifetime (duration) of the configuration.

Then the base station decides (step 504), whether or not to use dynamic allocation. The decision may be based on user equipment capabilities, amount and/or type of the information to be transmitted, etc. For example, LTE release 8 user equipment do not support semi-persistent periodic information on PUSCH, but if allocated dynamically, they can be allocated to use the same resources.

If the dynamic allocation is to be applied, the basic configuration is sent, in step 505, in a higher layer signalling, either in a user equipment-specific signalling or in a cell-specific signalling. The base station also allocates a sub-channel from the resources allocated in step 506, the allocation including, if the user equipment supports, assigning additional cover codes, etc. Then the sub-channel information is sent, in step 507, in an uplink grant, as many times as required to transmit the information for which resources are allocated (or as long as the resources reserved to the basic configuration are allocated.)

If the semi-persistent allocation is to be applied, the base station defines, in step 508, rest of the configuration, including the sub-channel configuration, and sends, in step 509, the configuration in a higher layer user equipment-specific signalling.

When another user equipment is to be scheduled, the base station starts again in step 501. If a configuration exists, has enough resources available, and the configuration is an appropriate one (step 502), the base station proceeds to step 504 to determine whether or not dynamic allocation is to be applied.

In another embodiment of the invention dynamic allocation is always applied.

In a further embodiment, if a basic configuration exists but if it is not suitable, the basic configuration is reconfigured.

Figure 6:
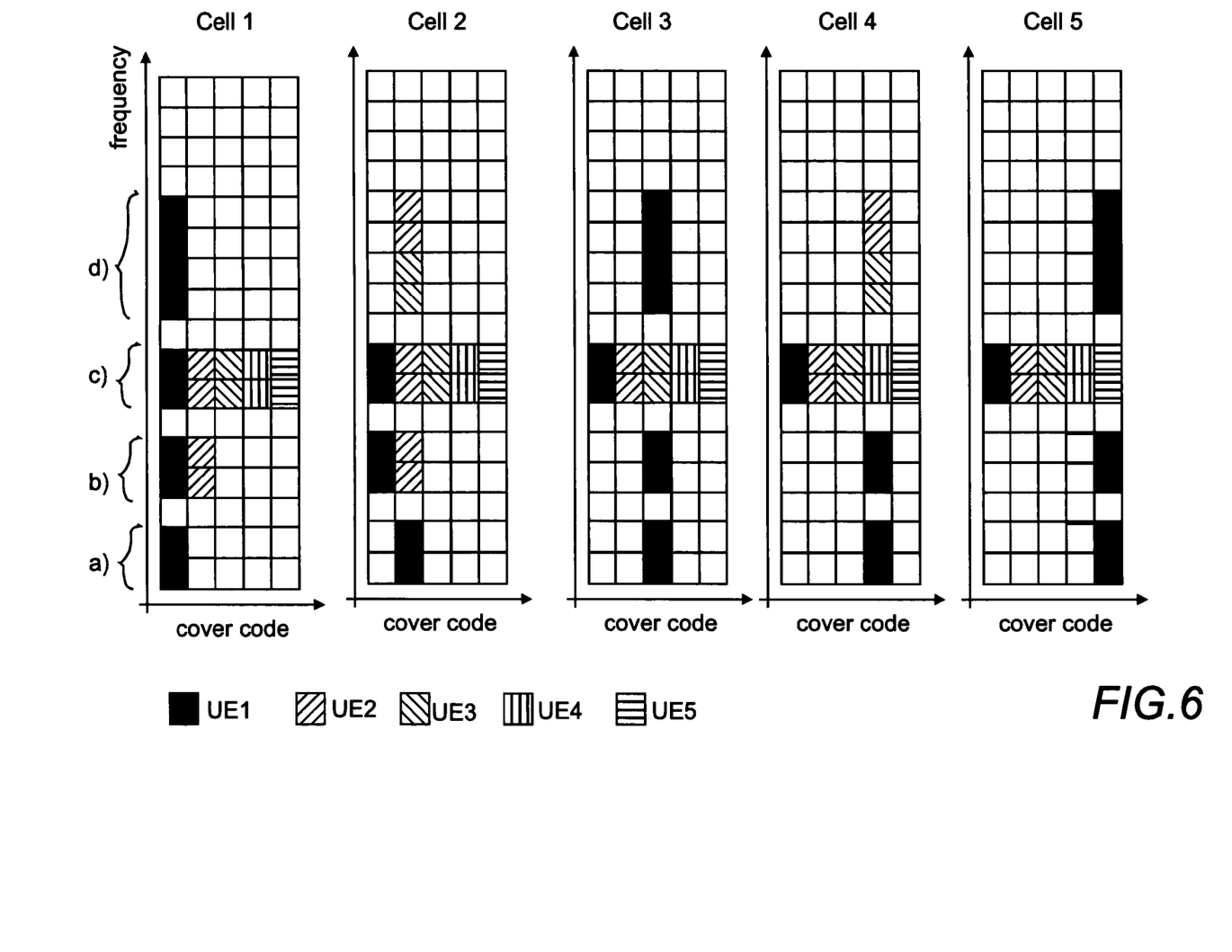
FIG. 6 illustrates an exemplary use case according to an embodiment.

FIG. 6 illustrates an exemplary use case how a cover code (i.e. a block level spreading code) can be utilized between different cells according to an embodiment when the coordinated multi-point is applied in uplink. In the illustrated example it is assumed that five code channels/one time slot are available within the allocated (assigned) PUSCH frequency resource. Following interference avoidance strategies between the cells may be used to manage the channel resources by means of co-ordinatedly allocating orthogonal code resources between cells:

a) a full cover code reuse between different cells (1 user/cell/resource), b) a partial cover code reuse between different cells (inter-cell interference coordination, ICIC), c) a reuse-1 (all cover code resources are in use in different cells), d) a full cover code reuse between different cells, variable bandwidth allocation between the cells (1 user/cell/resource).

An advantage of the cover code reuse between the cells is that a low-complexity, low-delay multi-cell reception is enabled since there is no need to an advanced interference cancelling of multi-cell receivers, and thereby the additional delay caused by it is avoided.

Figure 7:
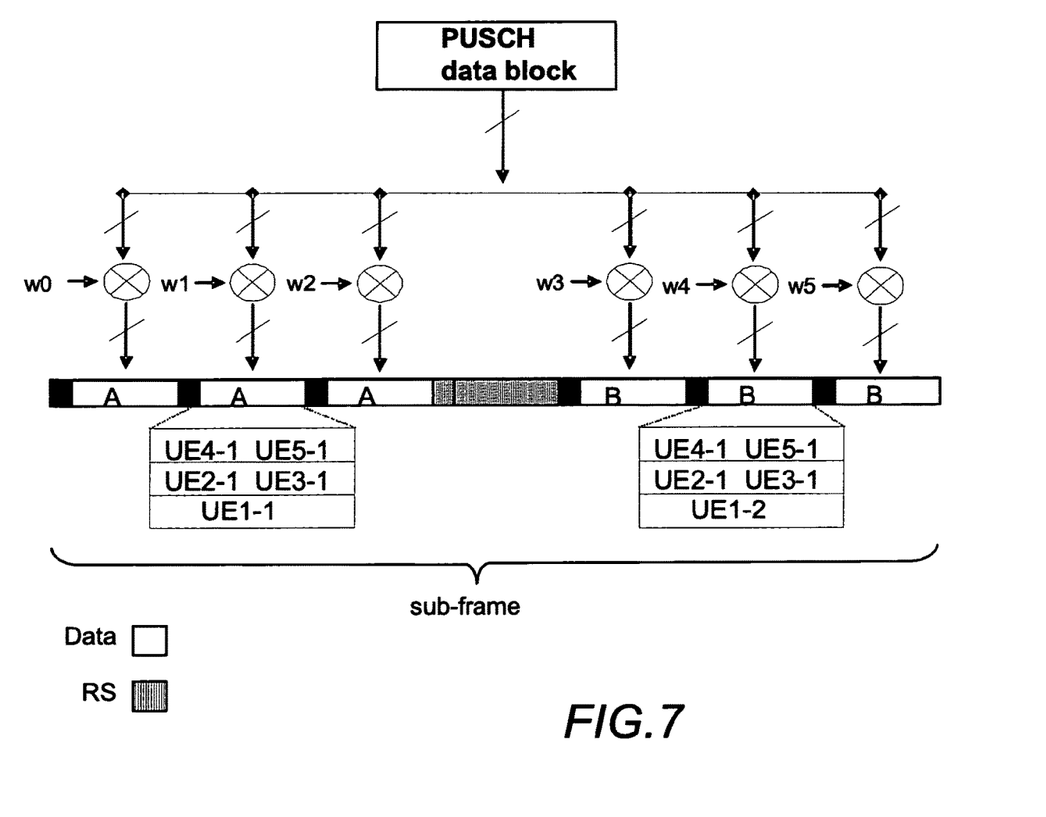
FIG. 7 shows an example of a block wise spreading according to an embodiment.

FIG. 7 shows an example of a block wise spreading according to an embodiment, in which the block wise spreading is applied to periodic data sent on PUSCH. The block wise spreading increases the multiplexing capacity by a spreading factor (SF) used. As can be seen from FIG. 7, the block wise spreading of the resources received for the periodic data on PUSCH (periodic PUSCH) resembles a block wise spreading according to PUCCH format 1/1a/1b. In the latter, however, only one symbol is sent, whereas in the embodiment, the amount of sent symbols, including data symbols and reference signal (RS) symbols, is bigger. For example, the amount of data symbols is 12 times the amount of allocated physical resource blocks.

The block wise spreading illustrated in FIG. 7 may be performed over one time slot and/or sub-frame, excluding the reference signal (RS) blocks, regardless of the amount of data blocks in a time slot/sub-frame. Further, the symbol-rate (i.e. the size of the information sent periodically on PUSCH) may be adjusted by modifying the length of the block coding. The length may be modified by modifying the spreading factor used. For example, the spreading factor (i.e. the length of the block-spreading code) may be part of a sub-frame, the spreading factor may be shorter than the number of sub-frames, an additional cover code may be allocated to user equipment providing smaller periodic information, and if there are several TTIs in the transmission, a sub-frame repetition for the entire data blocks including CRC may be applied, and orthogonal cover codes may be applied over the repeated sub-frames.

In an example illustrating the use of a variable spreading factor and an additional cover code, and thereby the possibility to trade-off the processing gain provided by a channel coding (i.e. a symbol rate) and an interference suppression provided by an orthogonal channelization, which provides an optimized capacity/coverage for the CoMP feedback. In the example, two or more user equipment are transmitting feedback information on PUSCH, user equipment 1 transmitting two data blocks per slot, and the other user equipment are each sending only one data block per slot. If the spreading is performed within a sub-frame and the spreading factor is 6, it is possible to multiplex the 6 user equipment. However, resources reserved for each user equipment are the same, although half of the resources reserved would have been sufficient for user equipment 2 to 6. Instead, if a spreading factor 3 is used, user equipment 1 may be assigned a cover code #1, and the user equipment 1 can send one data block (UE1-1) in the beginning (denoted with A) of the sub-frame and the other data block (UE1-2) in the end (denoted with B) of the sub-frame. However, since the other user equipment send only one data block, the same block code will be repeated in the beginning of the sub-frame and in the end of the sub-frame, and an additional block cover can be added on the repetition (i.e. the block coding is two-level block coding). Therefore user equipment 2 may be assigned a cover code #2, and an additional cover code #1, so that half of the data block UE2-1 is sent in the beginning of the sub-frame, half in the end. In the illustrated example user equipment 3 is also assigned the cover code #2, but an additional cover code #2, user equipment 4 is assigned a cover code #3, and the additional cover code #1, and user equipment 5 is assigned the cover code #3 and the additional cover code #2. The additional cover code may be included in a weighting coefficient, or it may be a separate operation, for example. Thus, 5 user equipments are multiplexed, and the size of the feedback information is for user equipment 1 twice the size for other user equipment. Indexes w0, w1, etc., are orthogonal cover code elements with which a repeated data block is multiplied.

It should be appreciated that additional cover code may be applied over a slot/subframe, although in the example the additional cover code is applied within a slot.

Orthogonal sub-channels are provided with orthogonal reference signals which may be arranged by means of cyclic shift separation inside a reference signal block. Alternatively, a block level spreading over consecutive reference signal blocks may be utilized. It is also possible to combine cyclic shift separation and block level spreading. Further, it may be sufficient to provide low cross-correlation reference signals (instead of orthogonal reference signals) for different orthogonal sub-channels.

As regards presence of a sounding reference signal, SRS, periodic information on PUSCH and block spreading, the base station may allocate resources so that bandwidths allocated to periodic information on PUSCH and bandwidths allocated for SRS are not overlapping. In another embodiment, the bandwidths may overlap and the blockwise spreading of the periodic information on PUSCH is configured to enable puncturing of the last PUSCH symbol. This may be achieved by configuring different spreading factors for the sub-frames with and without the possibility to convey SRS. Another alternative is provide user equipment transmitting SRS with information on frequency/time resources occupied by the periodic information on PUSCH so that the user equipment is able to truncate or drop SRSs overlapping with the periodic information on PUSCH.

If user equipment A has been configured to transmit both the periodic information on PUSCH and SRS on the same sub-frame, simultaneous transmission of them may be denied, and preferably SRS is dropped. This implementation has an advantage that it does not increase cubic metric of the transmitted signal. An alternative implementation is that simultaneous transmission of periodic information on PUSCH and SRS is allowed, at the expense of increased cubic metric.

In an embodiment, where the periodic information on PUSCH is used with the component carrier aggregation, a coding of a rank indicator corresponding to multiple component carriers and other channel state information corresponding to the multiple component carriers depends on an implementation: they, or at least one of them, may be separately or jointly coded.

In an embodiment, where the periodic information on PUSCH is used with the coordinated multi-point, coding of a rank indicator corresponding to multiple cells and other channel state information corresponding to the multiple cells depends on an implementation: they, or at least one of them, may be separately or jointly coded.

It should be appreciated that channelization is not affected by the implemented coding method (joint or separate).

The steps/points, messages, information exchange and related functions described above in FIGS. 2 to 7 are in no absolute chronological order, and some of the steps/points or functions may be performed and/or messages sent simultaneously or in an order differing from the given one. Other functions can also be executed between the points or functions or within the steps/points and other messages sent between the illustrated messages. Some of the functions or the steps/points or part of the steps/points can also be left out or replaced by a corresponding function or step/point or part of the step/point. Further, functions, steps/points and/or messages described with different embodiments may be combined to obtain further embodiments. The messages are only exemplary and may even comprise several separate messages for transmitting the same information. In addition, the messages may also contain other information. Depending on the network technologies involved, other entities may take part to the messaging than those described above.

It should be appreciated that the above described scheme for periodic information (reporting) on PUSCH may be considered as having a new, configurable and scalable sub-channel on a physical uplink shared channel, the configuration comprising one or more parameters/parameter sets defining what is to be sent on periodic reports (i.e. the content of a report, the report covering transmission of any kind of information), and/or one or more parameters/parameter sets defining when a report is sent, and/or one or more parameters/parameter sets defining what transmission format is to be used, and/or one or more parameters/parameter sets defining what air interface resource to use. Another alternative is to divide the parameters into two sub-groups; parameters configuring the physical sub-channel, and parameters relating to a content of reports to be sent over the sub-channel. In an embodiment one or more parameters required to configure the physical sub-channel are mandatory, but the parameters relating to the content are optional. Referring to table 1, parameters configuring the physical sub-channel may include parameters 1, 5, 6, 7, 9, 10, 8 (if hopping is supported), 11 (if multi-antenna user equipment), 12 (if simultaneous ACK/NAK is supported), and 13 (if TTI bundling/repetition is supported), rest of the parameters (i.e. parameters 2, 3, 4, and 14) relate to the content, and especially to the content of control information, and may be omitted if the configuration is made for other data than control information.

When the sub-channel is configured semi-persistently, it may be considered as a dedicated channel or a dedicated resource (both in frequency and time).

The techniques described herein may be implemented by various means so that an apparatus implementing one or more functions of a corresponding user equipment or base station described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
receiving, on a physical downlink control channel from a base station in a radio resource control signaling, a configuration for transmission of periodic feedback information to the base station, the transmission to be performed concurrently on a physical uplink shared channel and on a physical uplink control channel, and an indication, received as part of the configuration, of the resources allocated on the physical uplink shared channel and on the physical uplink control channel for the transmission, wherein the indication is used with component carrier aggregation and includes information corresponding to multiple component carriers;
detecting that the configuration contains a parameter indicating a periodicity for transmission of the periodic feedback information;
acknowledging, to the base station, receipt of the configuration on a physical uplink control channel;
collecting the periodic feedback information; and
transmitting the collected periodic feedback information at the periodicity indicated to the base station according to the configuration, the transmitting performed concurrently on the physical uplink shared channel and on the physical uplink control channel on the resources allocated on the physical uplink shared channel and on the physical uplink control channel;
the collecting and transmitting performed at the periodicity indicated until a modified configuration or a release of the allocated resources is received from the base station on the physical downlink control channel, wherein the periodic feedback information includes component carrier aggregation-specific information.

2. The method as claimed in claim 1, wherein the periodic feedback information is channel state information, and wherein the method further comprises performing channel state measurements according to the configuration.

3. The method as claimed in claim 1, wherein the configuration further includes an indication of duration of resource allocations for the resources allocated on the physical uplink shared channel and on the physical uplink control channel for the transmission.

4. The method as claimed in claim 1, wherein the configuration further includes an indication of periodicity of the transmitting the periodic feedback information in terms of subframes.

5. The method as claimed in claim 1, wherein the configuration further includes an indication of an offset, wherein reporting instances for the periodic period feedback information are subframes satisfying $(10 \times n_f + \lfloor n_s/2 \rfloor - N_{OFFSET})$ mod $N_P = 0$, where $n_f$ is a system frame number, $n_s = \{0, 1, \ldots, 19\}$ is a slot index within the frame, $N_{OFFSET}$ is corresponding periodic feedback reporting offset in subframes, and $N_P$ is a periodic feedback period in sub-frames.

6. The method as claimed in claim 1, wherein the configuration further includes an indication of resource block assignment for the resources allocated on the physical uplink shared channel and on the physical uplink control channel for the transmission.

7. The method as claimed in claim 1, wherein the configuration further includes an indication of whether or not a report, containing the collected periodic feedback information, is split into multiple subframes.

8. An apparatus comprising:
at least one processor; and
at least one memory including computer program code, the at least one memory and the computer program code configured, with the at least one processor, to cause the apparatus at least to perform:
receiving, on a physical downlink control channel from a base station in a radio resource control signaling, a configuration for transmission of periodic feedback information to the base station, the transmission to be performed concurrently on a physical uplink shared channel and on a physical uplink control channel, and an indication, received as part of the configuration, of the resources allocated on the physical uplink shared channel and on the physical uplink control channel for the transmission, wherein the indication is used with component carrier aggregation and includes information corresponding to multiple component carriers;
detecting that the configuration contains a parameter indicating a periodicity for transmission of the periodic feedback information;
acknowledging, to the base station, receipt of the configuration on a physical uplink control channel;
collecting the periodic feedback information; and
transmitting the collected periodic feedback information at the periodicity indicated to the base station according to the configuration, the transmitting performed concurrently on the physical uplink shared channel and on the physical uplink control channel on the resources allocated on the physical uplink shared channel and on the physical uplink control channel;
the collecting and transmitting performed at the periodicity indicated until a modified configuration or a release of the allocated resources is received from the base station on the physical downlink control channel, wherein the periodic feedback information includes component carrier aggregation-specific information.

9. The apparatus as claimed in claim 8, wherein the periodic feedback information is channel state information, and
wherein the at least one memory and the computer program code are further configured, with the at least one processor, to cause the apparatus to perform channel state measurements according to the configuration.

10. The apparatus as claimed in claim 8, wherein the apparatus is a user equipment or a relay node.

11. The apparatus as claimed in claim 8, wherein the at least one memory and the computer program code are further configured, with the at least one processor, to cause the apparatus to support single user multiple input multiple output, multi-user multiple input multiple output, and/or coordinated multi-point.

12. The apparatus as claimed in claim 8, wherein the configuration further includes an indication of duration of resource allocations for the resources allocated on the physical uplink shared channel and on the physical uplink control channel for the transmission.

13. The apparatus as claimed in claim 8, wherein the configuration further includes an indication of periodicity of the transmitting the periodic feedback information in terms of subframes.

14. The apparatus as claimed in claim 8, wherein the configuration further includes an indication of an offset, wherein reporting instances for the periodic feedback information are subframes satisfying $(10 \times n_f + \lfloor n_s/2 \rfloor - N_{OFFSET})$ mod $N_P=0$, where $n_f$ is a system frame number, $n_s=\{0, 1, \ldots, 19\}$ is a slot index within the frame, $N_{OFFSET}$ is corresponding periodic feedback reporting offset in sub-frames, and $N_P$ is a periodic feedback period in sub-frames.

15. The apparatus as claimed in claim 8, wherein the configuration further includes an indication of resource block assignment for the resources allocated on the physical uplink shared channel and on the physical uplink control channel for the transmission.

16. The apparatus as claimed in claim 8, wherein the configuration further includes an indication of whether or not a report, containing the collected periodic feedback information, is split into multiple subframes.

17. A computer program product comprising a non-transitory computer-readable storage medium bearing computer program code embodied therein for use with a computer, the computer program code comprising code for performing the following:

receiving, on a physical downlink control channel from a base station in a radio resource control (RRC) signaling, a configuration for transmission of periodic feedback information to the base station, the transmission to be performed concurrently on a physical uplink shared channel and on a physical uplink control channel, and an indication, received as part of the configuration, of the resources allocated on the physical uplink shared channel and on the physical uplink control channel for the transmission, wherein the indication is used with component carrier aggregation and includes information corresponding to multiple component carriers;

detecting that the configuration contains a parameter indicating a periodicity for transmission of the periodic feedback information;

acknowledging, to the base station, receipt of the configuration on a physical uplink control channel;

collecting the periodic feedback information; and transmitting the collected periodic feedback information at the periodicity indicated to the base station according to the configuration, the transmitting performed concurrently on the physical uplink shared channel and on the physical uplink control channel on the resources allocated on the physical uplink shared channel and on the physical uplink control channel;

the collecting and transmitting performed at the periodicity indicated until a modified configuration or a release of the allocated resources is received from the base station on the physical downlink control channel, wherein the periodic feedback information includes component carrier aggregation-specific information.

* * * * *